United States Patent

Wong

[11] Patent Number: 5,717,984
[45] Date of Patent: Feb. 10, 1998

[54] DRIVING, STEERING AND TENSIONING ROLL FOR BELT LOOPS

[75] Inventor: Lam F. Wong, Fairport, N.Y.

[73] Assignee: Xerox Corporation, Stamford, Conn.

[21] Appl. No.: 584,764

[22] Filed: Jan. 11, 1996

[51] Int. Cl.[6] .................................................. G03G 15/00
[52] U.S. Cl. .............................. 399/165; 198/806; 399/26
[58] Field of Search .............................. 399/162, 165, 399/303, 312, 313, 11, 26; 198/807, 806

[56] References Cited

U.S. PATENT DOCUMENTS

| | | | |
|---|---|---|---|
| 4,061,222 | 12/1977 | Rushing | 198/807 |
| 4,170,175 | 10/1979 | Conlon | 399/288 X |
| 4,174,171 | 11/1979 | Hamaker | 399/165 |
| 4,344,693 | 8/1982 | Hamaker et al. | 399/165 |
| 4,572,417 | 2/1986 | Joseph et al. | 198/807 X |
| 4,961,089 | 10/1990 | Jamzadeh | 399/165 |
| 5,078,263 | 1/1992 | Thompson et al. | 198/807 |
| 5,467,171 | 11/1995 | Castelli et al. | 399/162 |
| 5,515,139 | 5/1996 | Hou et al. | 198/807 X |

Primary Examiner—Shuk Lee
Attorney, Agent, or Firm—Kevin R. Kepner

[57] ABSTRACT

An apparatus for driving, steering and maintaining tension on a moving web, particularly in an electrophotographic printing machine of the type having an endless photoreceptor belt supported by a plurality of rolls and arranged to move in a predetermined path through a plurality of processing stations disposed therealong the belt being of the type which is supported by a plurality of rolls. A belt utility roll for driving, steering and maintaining tension on the belt adapted for rotational movement about a first axis and tilting movement about a second axis transverse to the first axis is used. The drive motor and transmission are mounted integral to the utility roll unit and tilt with the roll. An actuator tilts the roll in one of two directions to cause the belt to laterally walk along the roll to maintain the predetermined belt path. A belt edge sensor can be utilized to track the position of the belt and feed that information to the machine controller which then actuates the steering actuator to tilt the roll to the extent and for as long as is necessary to maintain the proper belt tracking pattern on the roll.

6 Claims, 3 Drawing Sheets

DRIVING, STEERING AND TENSIONING ROLL FOR BELT LOOPS

This invention relates generally to a belt driving, steering, and tensioning system and more particularly concerns a compact device to drive, steer and tension a belt to maintain proper belt tracking characteristics.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

Many commercial applications of the above process employ a photoconductive member in the form of a belt which is supported about a predetermined path past a plurality of processing stations to ultimately form a reproduced image on copy paper. The location of the latent image recorded on the photoconductive belt must be precisely defined in order to have the various processing stations acting thereon optimize copy quality. To this end, it is critical that the lateral alignment of the photoconductive belt be controlled within prescribed tolerances. Only in this manner will a photoconductive belt move through a predetermined path so that the processing stations disposed thereabout will be located precisely relative to the latent image recorded thereon. Lateral movement of the photoconductive belt is particularly a problem in connection with color copiers where the precise tracking of the belt is mandatory for acceptable copy quality.

When considering control of the lateral movement of the belt, it is well known that if the belt were perfectly constructed and entrained about perfectly cylindrical rollers mounted and secured in an exactly parallel relationship with one another, there would be no lateral movement of the belt. In actual practice, however, this is not feasible. Due to the imperfections in the system's geometry, the belt velocity vector is not normal to the roller axis of the rotation, and the belt will move laterally relative to a roller until reaching a kinematically stable position.

Color printing has created a reduced design operating window for photoreceptor belt modules. In order to meet all the functional requirements, such as additional developers and larger cleaner, the size of the belt module has to grow to accommodate them. The added loads and color registration requirements also suggest the need for a larger drive roll wrap in an active belt steering system. Since the attributes of the drive roll, steering roll, and tensioning roll in a typical belt module are similar, this invention incorporates the use of a single utility roll to satisfy the three functions. Thus, the size of the module can be kept small, and the available belt waterfront or usable exposure at other than the drive roll, steering roll, and tensioning roll, is maximized.

Typical belt modules designed for color, such as a single pass image on image system, are required to interface with many imaging and marking process subsystems. The subsystems tend to take up a large amount of the belt waterfront. At the same time, backer bars and rollers are needed to position the interface properly. Consequently, a large portion of the total belt wrap is used up by the backer bars and rollers. In any belt module, the total available belt wrap is 360°. Accordingly all of the belt wrap must be allocated among the drive roll, steering roll, the tensioning roll, a stripping roll, spanning rolls, and the aforementioned backer bars, etc.

In the event that the steering roll soft axis motion and the tensioning roll hard axis motion disturb the imaging and marking processes, additional isolation rolls are needed to isolate these disturbances. It is clear from this that all of these separate subsystems interfaces with the belt module will cause the belt module to be large in size and difficult to drive with the little belt wrap that is available.

Accordingly, it is desirable to develop a belt steering system that is compact and allows a relatively large belt wrap for driving and steering purposes.

The following disclosures may be relevant to various aspects of the present invention:

U.S. Pat. No. 5,467,171

Inventor: Castelli et al.

Issue Date: Nov. 14, 1995

U.S. Pat. No. 4,061,222

Inventor: Rushing

Issue Date: Dec. 6, 1977

U.S. Pat. No. 4,572,417

Inventor: Joseph et al.

Issue Date: Feb. 25, 1986

U.S. Pat. No. 4,170,175

Inventor: ConIon, Jr.

Issue Date: Oct. 9, 1979

U.S. Pat. No. 4,174,171

Inventor: Hamaker et ano.

Issue Date: Nov. 13, 1979

U.S. Pat. No. 4,344,693

Inventor: Hamaker

Issue Date: Aug. 17, 1982

U.S. Pat. No. 4,961,089

Inventor: Jamzadeh

Issue Date: Oct. 2, 1990

U.S. Pat. No. 5,078,263

Inventor: Thompson et al.

Issue Date: Jan. 7, 1992

The relevant portions of the foregoing disclosures may be briefly summarized as follows:

U.S. Pat. No. 5,467,171 to Castelli et al. describes a web steering roll for supporting the web being adapted for rotational movement about a first axis and tilting movement about a second axis transverse to the first axis is used. A compact internal tilting mechanism utilizing a motor inside of the roll connected at one end to a first pin extending outwardly from one end of said steering roll, the first pin being positioned eccentrically of the rotary axis, and a second pin extending outwardly at the other end of the roll also positioned eccentrically of the rotary axis and connected to the motor through a connecting mechanism so that when said motor is actuated the second pin rotates in a direction opposed to that of the first pin.

U.S. Pat. No. 4,061,222 to Rushing discloses an apparatus for tracking an endless belt along an endless path by a tiltable belt steering roller whose position is continually adjusted so that the belt is maintained at a stable equilibrium position despite changes in the belt shape. The adjustment is determined by control circuitry which produces signals representative of lateral belt edge position, a desired belt edge position, and either a steering roller position or an instantaneous lateral belt deviation rate to produce a control signal which is applied to a gear motor to control the tilt angle of the steering belt roller. This apparatus utilizes the absolute control method.

U.S. Pat. No. 4,572,417 to Joseph et al. discloses an apparatus for controlling lateral, cross track alignment of a web moving along a path to minimize lateral deviation between successive discrete areas of the web. A steering roller supports the web for movement along the path and is rotatable about an axis perpendicular to a plane of the span of the web approaching the steering roller.

U.S. Pat. No. 4,170,175 to ConIon, Jr. discloses a system for tracking an endless belt which automatically compensates for creep of the belt. The belt is supported by four rollers. A first is a drive roller, a second and third are idler rollers, and a fourth roller is an idler roller with flared ends. The flared roller provides passive tracking without electronic or active feedback. One of the idler rollers is spring loaded such that when an edge of the belt creeps up on one of the flared ends of the fourth roller, that side of the spring loaded roller is caused to tilt due to increased belt stiffness on that side. This positions the belt laterally toward a central position.

U.S. Pat. No. 4,174,171 to Hamaker et ano. disclose an apparatus for controlling the lateral alignment of a moving photoconductive belt. A resilient support constrains lateral movement of the belt causing a moment to be applied to a pivotably mounted steering post. As a result, the steering post pivots in a direction to restore the belt along a predetermined path. This apparatus is passive and provides no active electronic feedback.

U.S. Pat. No. 4,344,693 to Hamaker disclose an apparatus for controlling the lateral alignment of a moving photoconductive belt. Lateral movement of the belt causes a frictional force to be applied to the belt support. The frictional force tilts the belt support to restore the belt to the predetermined path of movement. This apparatus is passive and provides no active electronic feedback.

U.S. Pat. No. 4,961,089 to Jamzadeh discloses a method and apparatus for controlling lateral movement of a web along an endless path. The lateral position of the web is monitored and a determination is made by a control unit if the web is within predetermined limits such that a copying operation can be completed while the web is still properly tracking. If the web is not tracking properly, or if it is predicted that the web will track beyond its predetermined lateral limits within a copying operation, a correcting step is taken prior to the copying operation. The correcting step determines a tilt angle for a steering roller. Upon completion of the correcting step, the apparatus returns to a monitoring capacity and does not provide corrective measures until the web is beyond or is predicted to go beyond the predetermined limits during a subsequent copying operation. This insures that copying operations have proper registration and do not include corrective steps during the copying operation which might interfere with the registration. This apparatus uses an absolute scheme to determine corrective action.

U.S. Pat. No. 5,078,263 to Thompson et al. discloses an active steering method that introduces corrective skew through a small rotation about the "soft-axis" of one or more idler rolls. The skew is introduced by an external connection to a servo-motor to alter the angle at which the web enters or leaves the roll to cause the web to walk along the roll.

In accordance with one aspect of the present invention, there is provided an apparatus for controlling a web moving along a predetermined path. The apparatus comprises a utility roll for supporting the web, the web utility roll being adapted for driven rotational movement about a first axis and tilting movement about a second axis transverse to the first axis, means for sensing movement of the web in a direction substantially normal to the predetermined path and generating a signal indicative thereof and means, responsive to the signal generated by the sensing and generating means, for tilting the steering roll about the second axis, to return the web to the predetermined path.

Pursuant to another aspect of the present invention, there is provided an electrophotographic printing machine of the type having an endless photoreceptor belt supported by a plurality of rolls and arranged to move in a predetermined path through a plurality of processing stations disposed therealong. The improvement includes a utility roll for supporting the belt, the belt utility roll being adapted for driven rotational movement about a first axis and tilting movement about a second axis transverse to the first axis, means for sensing movement of the belt in a direction substantially normal to the predetermined path and generating a signal indicative thereof, and means, responsive to the signal generated by the sensing and generating means, for tilting the steering roll about the second axis, to return the belt to the predetermined path.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 3:
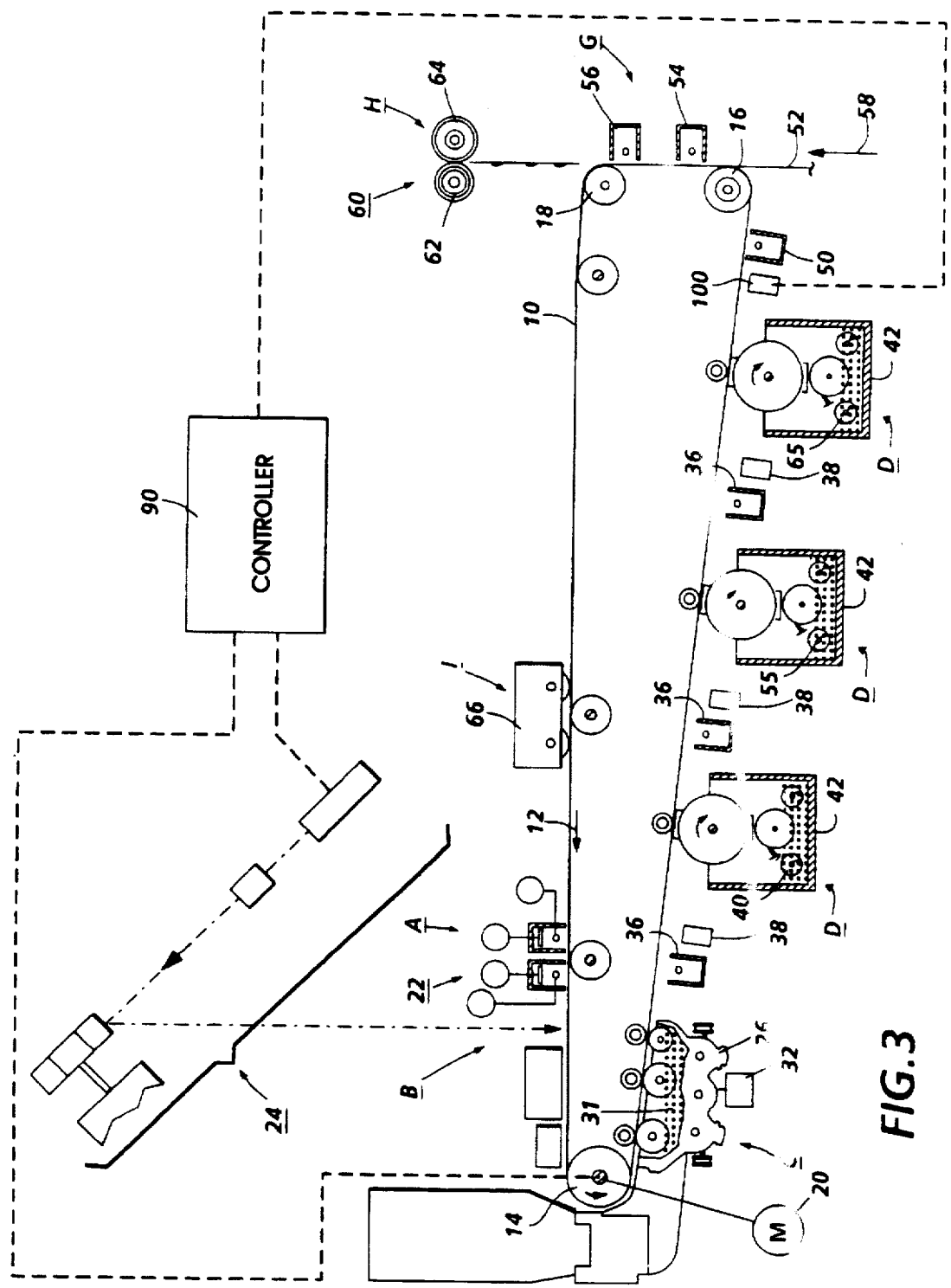
FIG. 3 is a schematic elevational view of a full color, single pass, image on image electrophotographic printing machine incorporating the FIG. 1 system therein.

Turning now to FIG. 3, the electrophotographic printing machine of the present invention uses a charge retentive surface in the form of an Active Matrix (AMAT) photoreceptor belt 10 supported for movement in the direction indicated by arrow 12, for advancing sequentially through the various xerographic process stations. The belt is entrained about a utility roller 14 of the present invention and two rollers 16 and 18 and the roller 14 is operatively connected to a drive motor 20 for effecting movement of the belt through the xerographic stations.

With continued reference to FIG. 3, a portion of belt 10 passes through charging station A where a corona generating device, indicated generally by the reference numeral 22, charges the photoconductive surface of belt 10 to a relative high, substantially uniform, preferably negative potential.

Next, the charged portion of photoconductive surface is advanced through an imaging station B. At exposure station B, the uniformly charged belt 10 is exposed to a laser based output scanning device 24 which causes the charge retentive surface to be discharged in accordance with the output from the scanning device. Preferably the scanning device is a laser Raster Output Scanner (ROS). Alternatively, the ROS could be replaced by other xerographic exposure devices such as LED arrays.

The photoreceptor, which is initially charged to a voltage $V_0$, undergoes dark decay to a level $V_{ddp}$ equal to about −500 volts. When exposed at the exposure station B it is discharged to $V_{image}$ equal to about −50 volts. Thus after exposure, the photoreceptor contains a monopolar voltage profile of high and low voltages, the former corresponding to charged areas and the latter corresponding to discharged or image areas.

At a first development station C, a magnetic brush developer structure, indicated generally by the reference numeral 26 advances insulative magnetic brush (IMB) material 31 into contact with the electrostatic latent image. The development structure 26 comprises a plurality of magnetic brush roller members. These magnetic brush rollers present, for example, charged black toner material to the image areas for development thereof. Appropriate developer biasing is accomplished via power supply 32.

A corona recharge device 36 having a high output current vs. control surface voltage (I/V) characteristic slope is employed for raising the voltage level of both the toned and untoned areas on the photoreceptor to a substantially uniform level. The recharging device 36 serves to recharge the photoreceptor to a predetermined level.

A second exposure or imaging device 38 which may comprise a laser based input and/or output structure is utilized for selectively discharging the photoreceptor on toned areas and/or bare areas, pursuant to the image to be developed with the second color developer. At this point, the photoreceptor contains toned and untoned areas at relatively high voltage levels and toned and untoned areas at relatively low voltage, levels. These low voltage areas represent image areas which are developed using discharged area development (DAD). To this end, a negatively charged, developer material 40 comprising color toner is employed. The toner, which by way of example may be yellow, is contained in a developer housing structure 42 disposed at a second developer station D and is presented to the latent images on the photoreceptor by a of a magnetic brush developer roller. A power supply (not shown) serves to electrically bias the developer structure to a level effective to develop the DAD image areas with negatively charged yellow toner particles 40.

The above procedure is repeated for a third imager for a third suitable color toner such as magenta and for a fourth imager and suitable color toner such as cyan. In this manner a full color composite toner image is developed on the photoreceptor belt.

To the extent to which some toner charge is totally neutralized, or the polarity reversed, thereby causing the composite image developed on the photor ptor to consist of both positive and negative toner, a neg. e pre-transfer dicorotron member 50 is provided to condi n the toner for effective transfer to a substrate using posi e corona discharge.

Subsequent to image development a sh t of support material 52 is moved into contact with the er images at transfer station G. The sheet of support mater l is advanced to transfer station G by conventional eet feeding apparatus, not shown. Preferably, the sheet f ding apparatus includes a feed roll contacting the uppern st sheet of a stack copy sheets. The feed rolls rotate so as t advance the uppermost sheet from stack into a chute whi directs the advancing sheet of support material into cont t with photoconductive surface of belt 10 in a timed seq nce so that the toner powder image developed thereon ontacts the advancing sheet of support material at transfer tation G.

Transfer station G includes a transfer dicorotr 54 which sprays positive ions onto the backside of she 52. This attracts the negatively charged toner powder in ges from the belt 10 to sheet 52. A detack dicorotron 56 provided for facilitating stripping of the sheets from the l t 10.

After transfer, the sheet continues to move, in he direction of arrow 58, onto a conveyor (not show ) which advances the sheet to fusing station H. Fusing ation H includes a fuser assembly, indicated generally by e reference numeral 60, which permanently affixes the tr sferred powder image to sheet 52. Preferably, fuser asse bly 60 comprises a heated fuser roller 62 and a backup or essure roller 64. Sheet 52 passes between fuser roller 2 and backup roller 64 with the toner powder image co acting fuser roller 62. In this manner, the toner powder im es are permanently affixed to sheet 52 after it is allowed cool. After fusing, a chute, not shown, guides the adv ncing sheets 52 to a catch tray, not shown, for subsequent re oval from the printing machine by the operator.

After the sheet of support material is separated rom photoconductive surface of belt 10, the residual tone particles carried by the non-image areas on the photocondu ive surface are removed therefrom. These particles are rem ed at cleaning station I using a cleaning brush structure n- tained in a housing 66.

It is believed that the foregoing description is sufficien or the purposes of the present application to illustrate e general operation of a color printing machine.

The table below illustrates key attributes of drivi , steering, and tensioning rolls. It can be seen that th r functional requirements are quite similar. By combini these functions into one utility roll, the design of the b module can be made more compact. Thus, additional fle ibility is allowed to the placement and orientation of t interfacing process subsystems.

|  | Driving | Steering | Tensioning |
| --- | --- | --- | --- |
| Wrap Angle | as large as possible | as large as possible | as large as possible |
| Coefficient of Friction | as high as possible | as high as possible | N/A |

Figure 1:
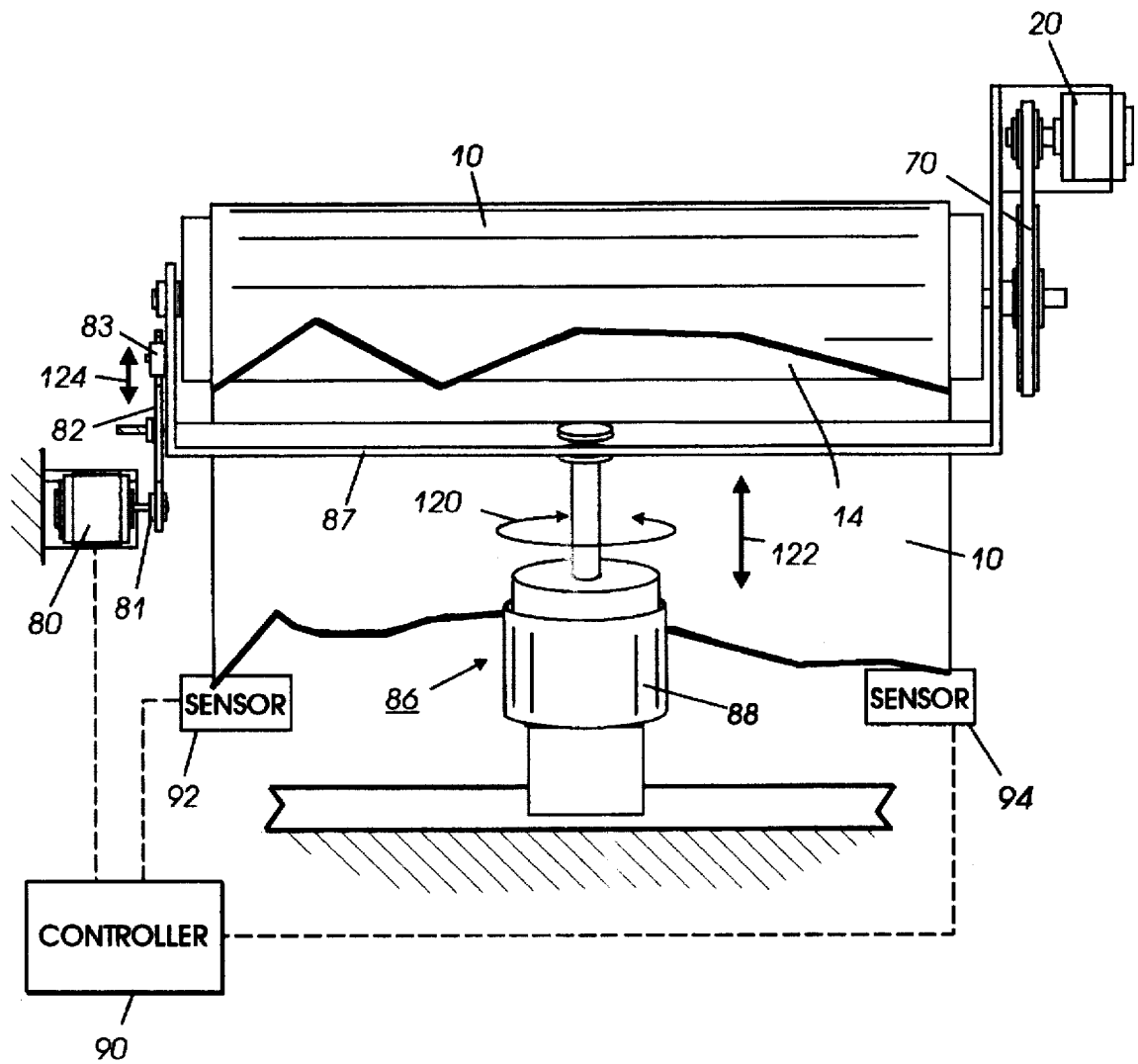
FIG. 1 is a plan view of the driving, steering, and tensioning system of the present invention.

FIG. 1 illustrates a plan view of the design of such a utility roll. The motor 20 and drive transmission 70 are mounted as an integral part at one end of the roll. This would usually be mounted at the inboard end of the roll 14 which would be toward the rear of the machine. Belt steering is provided by an outboard yolk mechanism 87. The roll is supported by a yoke assembly 87 which is allowed to pivot about the soft axis indicated by arrow 120 for steering and to be tensioned along the line indicated by arrow 122 to take up belt conicity.

Belt tensioning is accomplished by the sliding action of the fork 87 counterbalanced by a compression spring 88 located within the tensioning slide 86. Coulomb friction is left alone in the tensioning slide 86 to function as an energy dissipative mechanism to damp out disturbances from various sources. It can be seen that the driving, steering, and tensioning functions can be combined in one roll as described.

Figure 2:
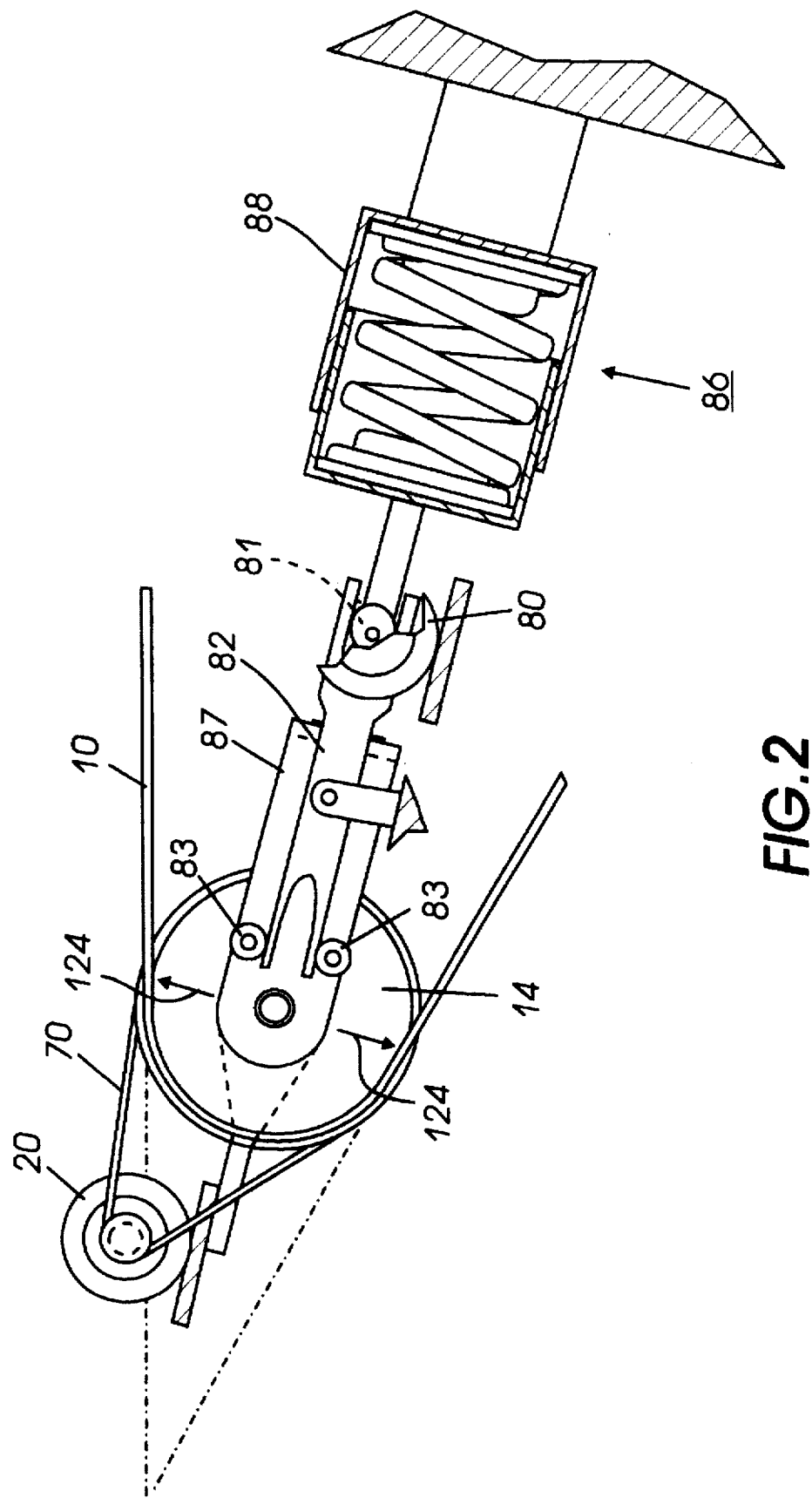
FIG. 2 is an end view of the FIG. 1 system.

FIG. 2 illustrates an end view of the utility roll as seen from the outboard portion of the machine. The support yolk 87 is illustrated as is the tensioning cylinder 86, which contains the compression spring 88, which is attached to the support yoke 87. Arrows 124 represent the line of movement along which the roll tilts to provide steering input. The soft axis angle is ideally the bisector of the angle formed by the span of the belt leading into the roll and the span of the belt exiting the roll, however other angles will accomplish belt steering.

A belt edge sensor 92 or plurality of sensors 92, 94 (FIG. 1) can then be utilized to track the position of the belt 10 and emit a signal indicative of the belt position to the machine controller 90. The controller 90, which is typically a microprocessor can then interpret the position and send actuation signals to the steering actuator 80 to control the degree and the duration of fill necessary to maintain the proper belt track. The steering actuator 80 is a rotary stepper motor and cam 81 to obtain precise steering control. The cam operates against a steering yoke 82 which is slidably attached to support yoke 87. As the cam 81 is rotated, the steering yoke 82 causes the end of roll 14 to be deflected up or down along arrows 124 as required to maintain the proper steering control. The yoke mechanism 82 is wedged between bearing 8 to eliminate backlash in the steering mechanism. Alternatively, a solenoid or a stepper motor and linkage can also be used to provide accurate steering adjustment. As is well known, if the tracking errors are cyclical with respect to the belt rotations, a profile of the belt edge can be generated and memorized by the microprocessor and the above compact steering mechanism can control the belt with a high degree of accuracy.

In recapitulation, there is provided an apparatus for driving, steering and maintaining tension on a moving web, particularly in an electrophotographic printing machine of the type having an endless photoreceptor belt supported by a plurality of rolls and arranged to move in a predetermined path through a plurality of processing stations disposed therealong the belt being of the type which is supported by a plurality of rolls. A belt utility roll for driving, steering and maintaining tension on the belt adapted for rotational movement about a first axis and tilting movement about a second axis transverse to the first axis is used. The drive motor and transmission are mounted integral to the utility roll unit and tilt with the roll. An actuator tilts the roll in one of two directions to cause the belt to laterally walk along the roll to maintain the predetermined belt path. A belt edge sensor can be utilized to track the position of the belt and feed that information to the machine controller which then actuates the steering motor to tilt the roll to the extent and for as long as is necessary to maintain the proper belt tracking pattern on the roll.

It is, therefore, apparent that there has been provided in accordance with the present invention, a compact driving, steering and tensioning system for an endless loop belt that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An apparatus for controlling and driving a web moving along a predetermined path, comprising:

a utility roll for supporting said web, said utility roll being driven rotationally about a first axis and having tilting movement about a second axis transverse to the first axis;

means for sensing movement of the web in a direction substantially normal to the predetermined path and generating a signal indicative thereof; and means, responsive to the signal generated by said sensing and generating means, for tilting said utility roll about the second axis, to return the web to the predetermined path said tilting means including a yoke, rotatably supporting said utility roll and to rotate said utility roll about said second axis and an actuator, connected to said yoke, for tilting said utility roll responsive to the signal from said sensing and generating means wherein said actuator comprises a stepper motor and a linkage, connecting said stepper motor to said yoke to accurately displace said utility roll to maintain the web on the predetermined path.

2. An apparatus as claimed in claim 1, further comprising;

a motor mounted integrally with said utility roll; and a transmission device for connecting said motor with said utility roll to rotate said utility roll about the first axis.

3. An electrophotographic printing machine having an endless photoreceptor belt supported by a plurality of rolls and arranged to move in a predetermined path through a plurality of processing stations disposed therealong, including:

a utility roll for supporting said belt, said utility roll being driven rotationally about a first axis and having tilting movement about a second axis transverse to the first axis;

means for sensing movement of the belt in a direction substantially normal to the predetermined path and generating a signal indicative thereof;

means, responsive to the signal generated by said sensing and generating means, for tilting said utility roll about the second axis, to return the belt to the predetermined path said tilting means includes a yoke, rotatably supporting said utility roll and to rotate said utility roll about said second axis and an actuator, connected to said yoke, for tilting said utility roll responsive to the signal from said sensing and generating means; and a tensioning device, said tensioning device acting along said second axis to properly tension the belt.

4. A printing machine as claimed in claim 3, further comprising;

a motor mounted integrally with said utility roll; and a transmission device for connecting said motor with said utility roll to rotate said utility roll about the first axis.

5. A printing machine as claimed in claim 3, wherein said actuator comprises:

a stepper motor; and a linkage, connecting said stepper motor to said yoke to accurately displace said utility roll to maintain the belt on the predetermined path.

6. A printing machine as claimed in claim 5, wherein said linkage comprises a cam rotatably connected to said stepper motor and contacting said yoke to displace said utility roll to effect belt steering.

* * * * *